UNITED STATES PATENT OFFICE.

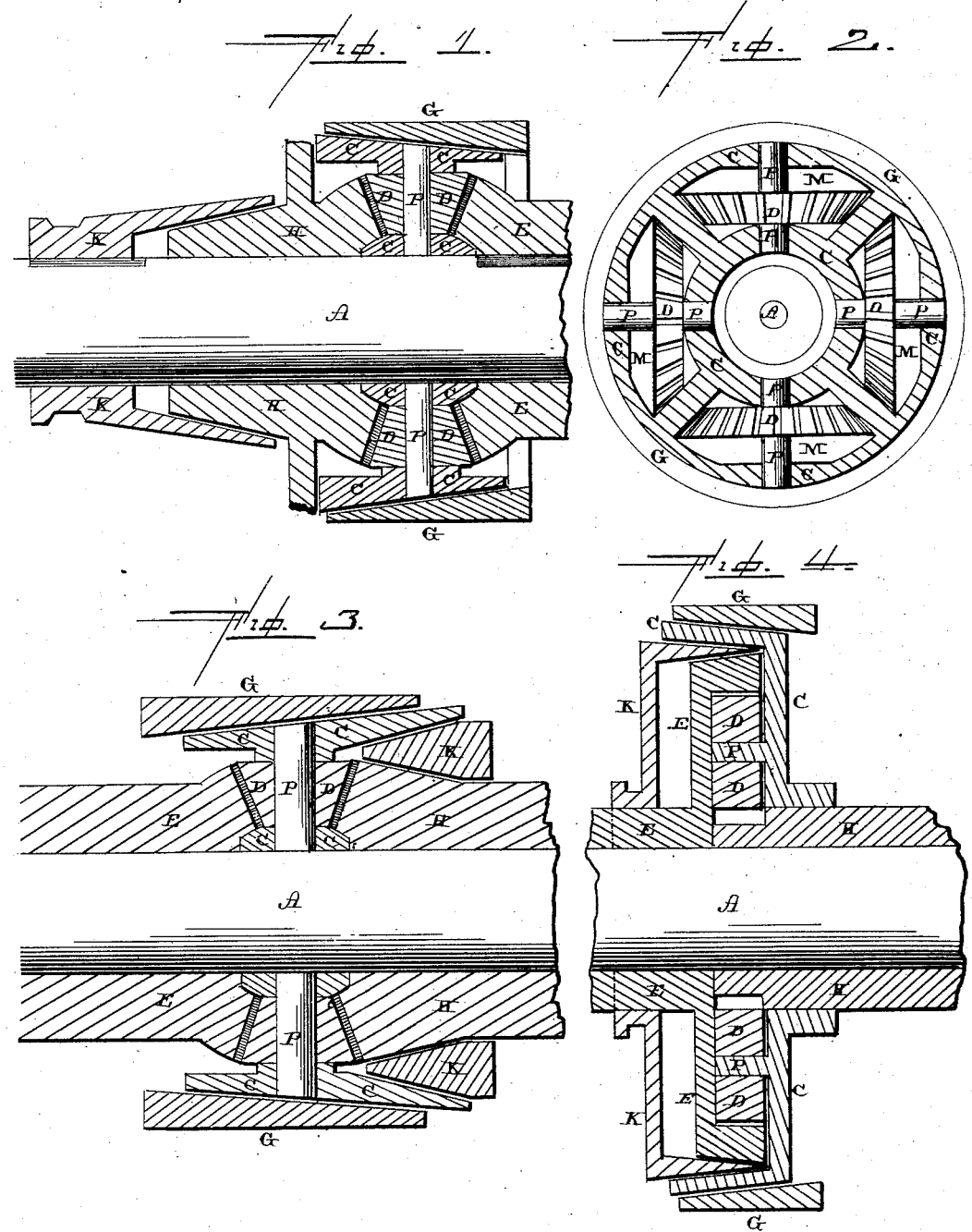

ISAAC LEHMER, OF STURGIS, MICHIGAN.

REVERSING-GEAR FOR TRACTION-ENGINES.

SPECIFICATION forming part of Letters Patent No. 320,665, dated June 23, 1885.

Application filed May 12, 1885. (No model.)

*To all whom it may concern:*

Be it known that I, ISAAC LEHMER, of Sturgis, in the county of St. Joseph and State of Michigan, have invented certain new and useful Improvements in Reversing-Gears for Traction-Engines; and I do hereby declare the following to be a full, clear, and exact description of the invention, such as will enable others skilled in the art to which it pertains to make and use it, reference being had to the accompanying drawings, which form a part of this specification.

My invention relates to an improvement in reversing-gears for traction-engines; and it consists in, first, the combination of a shaft, stud, or sleeve, a gear to which the driving power is applied, a wheel having suitable recesses formed in it, and carrying a number of pinions, the gear which imparts, transmits, or communicates the power, and a friction brake or clutch which is applied to the wheel carrying the pinions; second, the combination of the gear which receives the power, the wheel which revolves around the shaft, sleeve, or stud, and which carries a number of pinions, a gear which imparts, transmits, or communicates the power, and a friction brake or clutch which is applied to the driving-gear, and a second clutch which is applied to the wheel which carries the pinions, all of which will be more fully described hereinafter.

The object of my invention is to produce a reverse-gear for traction-engines and other machines where it is desirable to start and stop frequently, either quietly or suddenly, and to reverse the motion either quickly while the motive power is in full motion in one direction, and by means of which gear the power can be applied either slowly and lightly, or quickly and with full power, either forward or backward, and which gear is simple in construction and always safe and reliable in operation.

Figure 1 is a vertical longitudinal section of a reversing-gear which embodies my invention. Fig. 2 is a vertical cross-section of Fig. 1, showing the wheel. Fig. 3 is a vertical longitudinal section of a slightly-different form of my gear. Fig. 4 is a vertical section of one form of a modification of my invention, in which spur-wheels are used instead of beveled ones.

A represents the shaft, sleeve, or stud upon which the reversing-gear is mounted. Placed loosely upon this shaft, sleeve, or stud is a beveled gear, H, to which the driving power is applied. Upon the inner end of this gear H are formed beveled teeth for the purpose of meshing with the pinions D, which revolve loosely upon the stud P, which passes through the large wheel C. This wheel C revolves loosely around the shaft, sleeve, or stud A, and has a number of recesses made in it, as shown in Fig. 2, to receive the pinions D, which are carried around with the wheel C when it is made to revolve. The outer edge of this wheel C is so shaped that a friction clutch or brake G can be applied to it, and which is secured to some part of the machine and which has no rotary movement. When this brake or clutch is moved endwise so as to come in contact with the outer surface of the wheel C, all rotary motion of the wheel C is checked. The pinions D mesh with the gear E, which receives the power and communicates it through the shaft by being secured thereto, or through a gear which is attached to or forms a part of it. Where the gear is applied to the shaft or sleeve A, it may be keyed to it, so as to cause the shaft or sleeve to revolve.

The outer surface of the gear H may be shaped as shown in either Figs. 1 and 3, and to which a friction-clutch, K, is applied for the purpose of locking the gear to the shaft. In Fig. 1 the clutch is shown as feathered upon the shaft or sleeve, while in Fig. 3 the clutch K is applied between the inner surface of the wheel C and the outer surface of the gear H. In Fig. 1, where the friction brake or clutch K causes the gear H to revolve with the shaft or sleeve in Fig. 3, it causes the gear and the wheel C to revolve together, producing the same result as causing the gears H and E to revolve in the same direction. In Fig. 1 the gear H and wheel C are loose on the shaft, the pinions D revolve loosely in the wheel C, and the gear E and the clutch K are feathered on the shaft. As shown in Fig. 3, all the parts are loose on the stud.

The operation is as follows: Where the gear H is locked by a friction-clutch to the shaft, as shown in Fig. 1, or to the wheel C, as shown in Fig. 3, and the brake G is disengaged, then any motion given to the gear H will be followed by all the other parts in the same direction as if they were all made in one solid piece. In this case there is no wear, friction, or noise between the parts when in motion, and this is the condition of the device in the forward movement. To reverse the motion it is necessary to disengage the gear H from the shaft or sleeve in Fig. 1, or from the wheel C in Fig. 3, and to apply the brake G to the wheel C to arrest its motion. The motion of the gear H is then reversed in the gear E through the pinions D. Releasing both the gear H and wheel C allows both of these parts to revolve on the shaft or stud without communicating any motion to the gear E. In Fig. 3 the same result is produced by locking the gear E and wheel C, which is done by locking the gear H to the shaft in Fig. 1, or gear H to the wheel C in Fig. 3. In Fig. 4 spur-wheels are shown, instead of the beveled gears. The gear E and the wheel C are locked together inside of the gear H and wheel C, as shown in Fig. 3. The purpose is to lock the parts so that all parts must move together as if they were made in one solid piece. Any form of friction clutch or brake having sufficient power will answer the purpose of the ones here shown.

Reversing-gears of traction-engines are almost always placed in the engine itself. Practically such means are detrimental to the best performance of an engine, are expensive and troublesome to keep in repair, require skill to properly operate them, and are not always prompt and reliable in action. When the engine is running at full speed, the power stored in the fly-wheel and other moving parts of the engine must be overcome before the reverse action can take place. Under such circumstances engines are liable to serious injury. In a reverse-gear constructed as above described the power stored in the moving parts of the engine assists in making its action more prompt and powerful, and relieves the engine of the heavy strains caused by reversing the steam under full pressure and the engine at full speed. No skill is required, as there is no being caught on the center or jerking backward and forward in the attempt to stop at exactly a given spot. My gear may be operated rapidly or slowly, and with a certainty that a prompt response will follow each motion of the operating-lever. This gear allows the engine to run in one direction at all times, and the simplest form of engine can be used, and thus greatly cheapening the machine.

Having thus described my invention, I claim—

1. In a reversing-gear, the combination of the gear H, wheel C, pinions D, gear E, and a friction clutch or brake which is applied to the wheel C, substantially as described.

2. The combination of the gear H, the wheel C, pinions D, gear E, and the friction-brakes G K, substantially as set forth.

In testimony whereof I affix my signature in presence of two witnesses.

ISAAC LEHMER.

Witnesses:
AMOS MAST,
H. L. ANTHONY.